United States Patent
Kress et al.

(10) Patent No.: US 11,434,146 B2
(45) Date of Patent: Sep. 6, 2022

(54) METHOD FOR PRODUCING METAL OXIDES BY MEANS OF SPRAY PYROLYSIS

(71) Applicant: EVONIK OPERATIONS GMBH, Essen (DE)

(72) Inventors: Peter Kress, Karlstein (DE); Stipan Katusic, Bad Soden (DE); Armin Wiegand, Grosskrotzenburg (DE); Harald Alff, Kahl (DE); Michael Hagemann, Kahl (DE)

(73) Assignee: Evonik Operations GmbH, Essen (DE)

( * ) Notice: Subject to any disclaimer, the term of this patent is extended or adjusted under 35 U.S.C. 154(b) by 495 days.

(21) Appl. No.: 16/476,274

(22) PCT Filed: Dec. 20, 2017

(86) PCT No.: PCT/EP2017/083749
§ 371 (c)(1),
(2) Date: Jul. 6, 2019

(87) PCT Pub. No.: WO2018/127414
PCT Pub. Date: Jul. 12, 2018

(65) Prior Publication Data
US 2019/0352189 A1    Nov. 21, 2019

(30) Foreign Application Priority Data
Jan. 9, 2017   (EP) .................................... 17150660

(51) Int. Cl.
C01G 25/00  (2006.01)
B01J 4/00   (2006.01)
(Continued)

(52) U.S. Cl.
CPC ............ *C01G 25/006* (2013.01); *B01J 4/002* (2013.01); *B01J 10/002* (2013.01); *B01J 19/26* (2013.01); *C01F 11/04* (2013.01)

(58) Field of Classification Search
CPC ....... C01G 25/006; B01J 4/002; B01J 10/002; B01J 9/26; C01F 11/04
See application file for complete search history.

(56) References Cited

U.S. PATENT DOCUMENTS 4,410,501 A   10/1983  Taramasso et al.
5,919,430 A   7/1999   Hasenzahl et al.
(Continued)

FOREIGN PATENT DOCUMENTS

CN    1482062      3/2004
CN    101348263    1/2009
(Continued)

OTHER PUBLICATIONS

Office Action for copending U.S. Appl. No. 16/072,467, dated Sep. 1, 2020.
(Continued)

*Primary Examiner* — James A Fiorito
(74) *Attorney, Agent, or Firm* — Law Office of: Michael A. Sanzo, LLC

(57) ABSTRACT

A process for producing a metal oxide powder by flame spray pyrolysis where
a) a stream of a solution containing at least one oxidizable or hydrolysable metal compound is atomized to afford an aerosol by means of an atomizer gas,
b) this aerosol is brought to reaction in the reaction space of the reactor with a flame obtained by ignition of a mixture of fuel gas and air,
c) the reaction stream is cooled and
d) the solid product is subsequently removed from the reaction stream, wherein
(Continued)

e) the reaction space comprises one or more successive double-walled internals, wherein the wall of the double-walled internal facing the flame-conducting region of the reaction space comprises at least one slot through which a gas or vapour is introduced into the reaction space in which the flame is burning and f) the slot is arranged such that this gas or vapour brings about a rotation of the flame.

20 Claims, 2 Drawing Sheets

(51) Int. Cl.
*B01J 10/00* (2006.01)
*B01J 19/26* (2006.01)
*C01F 11/04* (2006.01)

(56) References Cited

U.S. PATENT DOCUMENTS

| | | |
|---|---|---|
| 5,958,361 A | 9/1999 | Laine et al. |
| 5,976,217 A | 11/1999 | Kneringer et al. |
| 6,106,803 A | 8/2000 | Hasenzahl et al. |
| 6,613,300 B2 | 9/2003 | Mangold |
| 7,510,693 B2 | 3/2009 | Katusic |
| 8,048,398 B2 | 11/2011 | Katusic et al. |
| 8,277,765 B2 | 10/2012 | Dietz et al. |
| 8,545,673 B2 | 10/2013 | Dietz et al. |
| 9,748,567 B2 | 8/2017 | Eihassid |
| 10,280,088 B2 | 5/2019 | Schulze Isfort et al. |
| 10,384,940 B2 | 8/2019 | Katusic et al. |
| 11,192,794 B2 | 12/2021 | Schmidt et al. |
| 2001/0036437 A1 | 11/2001 | Gutsch |
| 2002/0041963 A1 | 4/2002 | Konya et al. |
| 2005/0069506 A1 | 3/2005 | Katusic |
| 2005/0100666 A1 | 5/2005 | Hampden-Smith |
| 2007/0231280 A1 | 10/2007 | Schumacher et al. |
| 2009/0131694 A1 | 5/2009 | Schumacher et al. |
| 2010/0102700 A1 | 4/2010 | Jaiswal et al. |
| 2011/0171120 A1 | 7/2011 | Lortz et al. |
| 2011/0236288 A1 | 9/2011 | Panz et al. |
| 2013/0045158 A1 | 2/2013 | Katusic |
| 2014/0301942 A1 | 10/2014 | Hasenzahl et al. |
| 2017/0253547 A1 | 9/2017 | Corre et al. |
| 2017/0275166 A1 | 9/2017 | Katusic |
| 2017/0338487 A1 | 11/2017 | Katusic |
| 2020/0140282 A1 | 5/2020 | Erz et al. |
| 2020/0230703 A1 | 7/2020 | Katusic |
| 2020/0231438 A1 | 7/2020 | Schimek et al. |
| 2021/0163304 A1 | 6/2021 | Schmidt et al. |
| 2021/0387859 A1 | 12/2021 | Schmidt et al. |

FOREIGN PATENT DOCUMENTS

| | | |
|---|---|---|
| DE | 36 02 066 | 7/1987 |
| DE | 100 61 016 | 7/2002 |
| DE | 10 2015 104 653 | 9/2016 |
| EP | 0 306 018 | 3/1989 |
| EP | 0 471 139 | 2/1992 |
| EP | 0 814 058 | 12/1997 |
| EP | 1 138 632 | 10/2001 |
| EP | 1 142 830 | 10/2001 |
| EP | 2 944 611 | 11/2015 |
| WO | WO 99/06331 | 2/1999 |
| WO | WO 2004/048261 | 6/2004 |
| WO | WO 2009/059900 | 5/2009 |
| WO | WO 2011/005631 | 1/2011 |
| WO | WO 2016/169842 | 10/2016 |
| WO | WO 2018/024661 | 2/2018 |
| WO | WO 2018/201054 | 11/2018 |
| WO | WO 2020/064401 | 4/2020 |

OTHER PUBLICATIONS

Siriworarat, et al., "Production of methanol from carbon dioxide using palladium-copper-zinc loaded on MCM-41: Comparison of catalysts synthesized from flame spray pyrolysis and sol-gel method using silica source from rice husk ash," *Journal of Cleaner Production* 142:1234-1243 (2017).
Tani, et al., "Synthesis of zinc oxide/silica composite nanoparticles by flame spray pyrolysis," *Journal of Material Science* 37:4627-4632 (2002).
International Search Report for international application, PCT/EP2018/067265 filed Jun. 27, 2018; corresponding to copending U.S. Appl. No. 16/628,664.
Written Opinion of the International Searching Authority for international application PCT/EP2018/067265 filed Jun. 27, 2018; corresponding to copending U.S. Appl. No. 16/628,664.
International Preliminary Report on Patentability for international application PCT/EP2018/067265 filed Jun. 27, 2018; corresponding to copending U.S. Appl. No. 16/628,664.
European Search Report and Search Opinion with partial machine translation for EP 17179702.0 filed Jul. 5, 2017; corresponding to copending U.S. Appl. No. 16/628,664.
U.S. Appl. No. 16/628,664, filed Jan. 4, 2020, Erz.
European Office Action for corresponding copending U.S. Appl. No. 16/628,664, dated May 26, 2021.
Request for Continued Examination for copending U.S. Appl. No. 16/072,467, filed Jun. 29, 2021.
Amendment & Response to Accompany RCE for copending U.S. Appl. No. 16/072,467, filed Jun. 29, 2021.
Response to Office Action for copending U.S. Appl. No. 16/072,467, filed Dec. 1, 2020.
Final Office Action for copending U.S. Appl. No. 16/072,467, dated Mar. 2, 2021.
Liu, et al., "Study on the Calcination of Titanium Silicalite Zeolie (TS-1)," *Advanced Materials Research* 287-290:317-321 (2011).
U.S. Appl. No. 17/279,061, filed Mar. 23, 2021, Schmidt.
English language translation of the International Search Report for corresponding international application PCT/EP2017/083749 filed Dec. 20, 2017.
English language translation of the Written Opinion of the International Searching Authority for corresponding international application PCT/EP2017/083749 filed Dec. 20, 2017.
English language translation of the International Preliminary Report on Patentability for corresponding international application PCT/EP2017/083749 filed Dec. 20, 2017.
European Search Report and Opinion for counterpart application EP 17150660 with English language machine translation of Search Opinion attached.
Reply to European Search Opinion with English language machine translation attached, for counterpart application EP 17150660.
English language translation of the International Search Report for international application PCT/EP2017/051309, filed Jan. 23, 2017; corresponding to copending U.S. Appl. No. 16/072,467.
English language translation of the Written Opinion of the International Searching Authority for international application PCT/EP2017/051309, filed Jan. 23, 2017; corresponding to copending U.S. Appl. No. 16/072,467.
English language translation of the International Preliminary Report on Patentability for international application PCT/EP2017/051309, filed Jan. 23, 2017; corresponding to copending U.S. Appl. No. 16/072,467.
European Search Report and Opinion for U.S. Appl. No. 16/072,467 with English language machine translation of Search Opinion attached; counterpart of copending U.S. Appl. No. 16/072,467.
Reply to European Search Opinion with English language machine translation attached.; counterpart of copending U.S. Appl. No. 16/072,467.
Li, et al., "Flame aerosol synthesis of nanostructured materials and functional devices: Processing, modeling and diagnostics," *Progress in Energy and Combustion Science* 55:1-59 (May 2016).
Mädler, et al., "Flame-made ceria nanoparticles," *J. Mater. Res.* 17(6):1356-1362 (Jan. 2002).

(56) References Cited

OTHER PUBLICATIONS

Mädler, et al., "Controlled synthesis of nanostructured particles by spray pyrolysis," *Aerosol Science* 33(2):369-389 (Jan. 2002).
Wang, et al., "Ferroelectric $WO_3$ Nanoparticles for Acetone Selective Detection," *Chem. Mater.* 20:4794-4796 (Jan. 2008) with Supporting Information: Synthesis and Characterization Methods, pp. 1-5 attached (from Madler, et al. above).
Wegner, et al., "Scale-up of nanoparticle synthesis in diffusion flame reactors," *Chemical Engineering Science* 58:4581-4589 (Oct. 2003).
U.S. Appl. No. 16/072,467, filed Jul. 24, 2018, Katusic.
Barrett, et al., "The Determination of Pore Volume and Area Distributions in Porus Substances. I. Computations from Nitrogen Isotherms," *Journal of the American Chemical Society* 73(1):373-380 (Jan. 1951).
Lamberti, et al., "Structural Characterization of Ti-Silicate-1: A Synchrotron Radiation X-Ray Powder Diffraction Study," *Journal of Catalysis* 183(2):222 (Apr. 1999).
U.S. Appl. No. 16/770,593, filed Jun. 6, 2020, Schmidt.
Teoh, et al., "Flame spray pyrolysis: An enabling technology for nanoparticles design and fabrication," *Nanoscale* 8:1324-1347 (2010).
Wang, et al., "Flame aerosol synthesis of tungsten trioxide powder: Particle morphology control and photodegradation activity under visible light irradiation," *Powder Technology* 294:259-265 (2016).
Non Final Office Action for copending U.S. Appl. No. 16/072,467, dated Dec. 6, 2021.
Restriction Requirement for copending U.S. Appl. No. 16/628,664, dated Nov. 5, 2021.
Response to Restriction Requirement for copending U.S. Appl. No. 16/628,664, filed Dec. 31, 2021.
Non Final Office Action for copending U.S. Appl. No. 16/628,664, dated Feb. 14, 2022.

METHOD FOR PRODUCING METAL OXIDES BY MEANS OF SPRAY PYROLYSIS

CROSS REFERENCE TO RELATED APPLICATIONS

The present application is US national stage of international application PCT/EP2017/083749, which had an international filing date of Dec. 20, 2017, and which was published on Jul. 12, 2018. Priority is claimed to European application EP 17150660.3, filed on Jan. 9, 2017.

The invention relates to a process for producing metal oxides by means of spray pyrolysis.

Spray pyrolysis and flame spray pyrolysis are established processes for producing simple metal oxides right through to complex mixed metal oxides. In spray pyrolysis, metal compounds in the form of fine droplets are introduced into a high-temperature zone where they are oxidized and/or hydrolysed to give metal oxides. A special form of this process is that of flame spray pyrolysis, in which the droplets are supplied to a flame which is formed by ignition of a fuel gas and an oxygen-containing gas.

Numerous reaction parameters are available to the person skilled in the art in order to vary the physicochemical properties of the metal oxides produced. For instance, temperature, concentration of the metal compound, residence time and velocity of the reaction mixture influence the structure of the metal oxides.

Thus, erroneous settings often result in incomplete conversion of the input material, for instance by inclusion of the input material in the actually desired oxide.

EP-A-2944611 describes a process for producing a mixed oxide of composition $Li_xLa_3Zr_2Al_yO_{8.5+0.5x+1.5y}$ where $6 \leq x \leq 7$, $0.2 \leq y \leq 0.5$ having a garnet structure. An essential process step is flame spray pyrolysis where a solution containing the compounds of lithium, lanthanum, aluminium and zirconium is atomized into fine droplets and brought to reaction in a flame. The obtained product has the desired composition. However, the desired high crystallinity can only be achieved by an additional heat treatment step.

The situation is similar for the production of lithium-containing mixed oxides. EP-A-3026019 discloses a mixed oxide powder of composition $Li_{1+x}(Ni_aCo_bMn_c)B_dO_2$, where $0<x\leq0.2$; $0<a\leq1$; $0\leq b\leq1$; $0\leq c\leq1$, $0\leq d\leq0.2$. Flame spray pyrolysis does not result in the desired high crystallinity in this process either.

The problem addressed by the present invention is accordingly that of providing a process for producing metal oxides by flame spray pyrolysis which provides parameters which make it possible to specifically adjust the properties of the metal oxide to be produced. This includes for example complete conversion of the input materials or adjustment of the crystallinity of the metal oxides.

The invention provides a process for producing a metal oxide powder by flame spray pyrolysis where a) a stream of a solution containing at least one oxidizable or hydrolysable metal compound is atomized to afford an aerosol by means of an atomizer gas,
b) this aerosol is brought to reaction in the reaction space of the reactor with a flame obtained by ignition of a mixture of fuel gas and air,
c) the reaction stream is cooled and
d) the solid product is subsequently removed from the reaction stream, wherein
e) the reaction space comprises one or more successive double-walled internals, wherein the wall of the double-walled internal facing the flame-conducting region of the reaction space comprises at least one slot through which a gas or vapour is introduced into the reaction space in which the flame is burning and
f) the slot is arranged such that this gas or the vapour brings about a rotation of the flame.

FIGS. 1-3 show the process according to the invention in schematic form. FIG. 1 shows the arrangement for performing the process where A=metal solution; B=hydrogen; C=primary air; D=secondary air; R×R=reaction space; Fl=flame; I-III=internals I-III; $S_{I, 1-4}$=slots in internal I, here 4 slots 1-4; representative of further internals; E-I to E-III=gas/vapour feed point.

FIG. 2 shows in schematic form an internal with slots 1-4 in longitudinal section along the axis A-B (FIG. 2A) and B-A (FIG. 2B).

In the context of the present invention the term "internal" or "internals" is always to be understood as meaning double-walled internals. A reaction space and an internal are generally tubular. The internal is installed in the reaction space such that its outer wall is in contact with the inner wall of the reaction space. The internal is closed at top and bottom. If a plurality of internals are present these may be identical or different in terms of length or diameter for example. The successive internals may conduct identical or different gases. It is likewise possible for individual internals not to conduct gases.

Figures 3, 4:
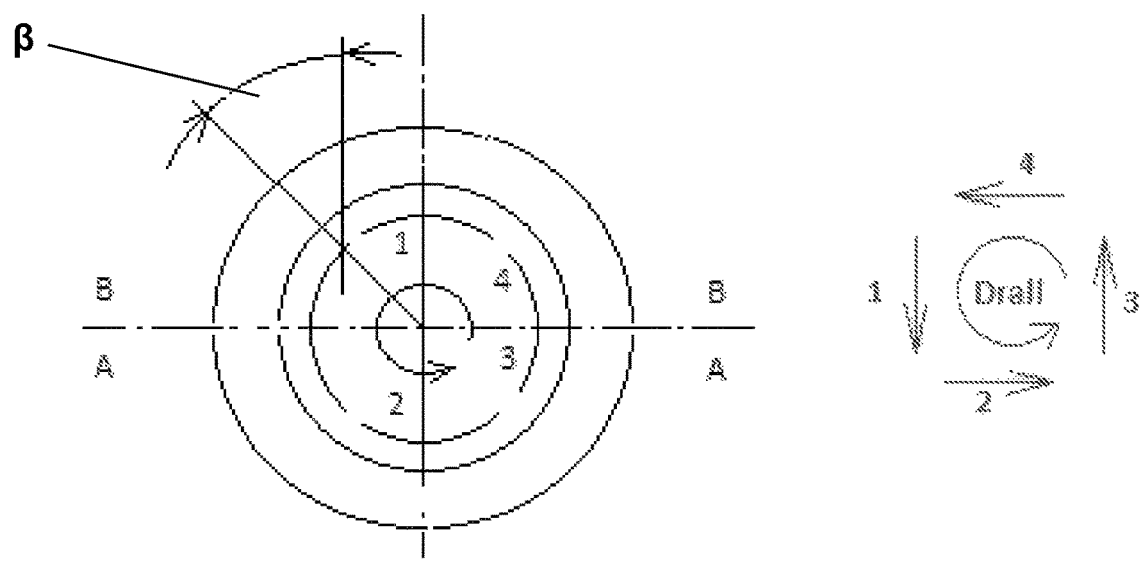
FIG. 3 shows the cross section through this internal with slots 1-4 and angle $\beta$.
FIG. 4 shows in schematic form the rotation of the flame brought about by the introduction of gas or vapour through 4 slots. The rotation causes the flame to become narrower and longer compared to a process according to the prior art which provides no internals according to the invention.

The process according to the invention is preferably implemented such that an internal comprises four slots. When the internal is taken to be tubular then in cross section the four slots are preferably arranged such that one slot is located in each quadrant. This is shown in FIG. 3.

Usually, the length of a slot is 50-100 mm, the width thereof is 0.5-3 mm and the slot length/slot width ratio is 10:1-200:1.

The angle $\alpha$ of a slot to the vertical is preferably $15°\leq\alpha\leq60°$ and particularly preferably $25°\leq\alpha\leq40°$.

The process as claimed in claims 1 to 5, characterized in that the angle $\beta$ which describes the angle between the section axis of the slot to the circle perpendicular of the centre is preferably $30°\leq\beta\leq60°$ and particularly preferably $40°\leq\beta\leq50°$.

A further feature with which the flame may be varied is the ratio of the diameter of the reaction space to the total slot area. This ratio is preferably 15:1-200:1 and particularly preferably 25:1-50:1.

The gas supplied via the slot in an internal may be a fuel gas. Examples of fuel gases are hydrogen, methane, ethane, natural gas and/or carbon monoxide. It is particularly preferable to employ hydrogen. A fuel gas is employed in particular for embodiments where a high crystallinity of the metal oxides to be produced is desired, for example for mixed lithium oxides for use in lithium ion batteries.

The gas supplied via the slot in an internal may be an oxygen-containing gas. This is generally air or oxygen-enriched air. An oxygen-containing gas is employed in particular for embodiments where for example a high BET surface area of the metal oxide to be produced is desired.

The fuel gas or oxygen-containing gas supplied via a slot in an internal is generally the same and as used for ignition of the flame in the reaction space. The total amount of oxygen is chosen such that, taken over all internals, it is sufficient at least for complete conversion of the fuel gas and the metal compounds.

Furthermore, inert gases such as nitrogen or reactive vapours such as water vapour may also be supplied via a slot in an internal.

In the process according to the invention the solution is introduced into the reaction space in the form of an aerosol. The fine droplets of the aerosol preferably have an average droplet size of 1-120 µm, particularly preferably of 30-100 µm. The droplets are typically produced using single- or multi-material nozzles. To increase the solubility of the metal compounds and to attain a suitable viscosity for atomization of the solution the solution may be heated.

Suitable solvents include water, alkanes, alkanecarboxylic acids and/or alcohols. Preference is given to using aqueous solutions, wherein an aqueous solution is to be understood as meaning a solution in which water is the main constituent of a solvent mixture or in which water alone is the solvent. The concentration of the employed solutions is not particularly limited. If only one solution containing all mixed oxide components is present, the concentration is generally 1 to 50 wt %, preferably 3 to 30 wt %, particularly preferably 5-20 wt %, in each case based on the sum of the oxides.

The metal compounds may be inorganic metal compounds, such as nitrates, chlorides, bromides, or organic metal compounds, such as alkoxides or carboxylates. The alkoxides employed may preferably be ethoxides, n-propoxides, isopropoxides, n-butoxides and/or tert-butoxides. The carboxylates used may be the compounds based on acetic acid, propionic acid, butanoic acid, hexanoic acid, oxalic acid, malonic acid, succinic acid, glutaric acid, adipic acid, octanoic acid, 2-ethylhexanoic acid, valeric acid, capric acid and/or lauric acid.

The metal component is preferably selected from the group consisting of Ag, Al, Au, B, Ba, Ca, Cd, Ce, Co, Cr, Cu, Dy, Fe, Ga, Ge, Hf, In, La, Li, Mg, Mn, Mo, Nb, Ni, Pd, Rh, Ru, Sc, Si, Sm, Sn, Sr, Ta, Ti, V, Y, Yb and Zn. In the context of the invention silica and boron are to be regarded as metals.

In a particular embodiment the solution contains Zn, Ti or Ca as the metal of the metal compound.

In a further particular embodiment the solution contains Li, La and Zr as the metal of the metal compound. In addition to these the solution may further contain Al, Au, Ba, Ca, Ce, Dy, Ga, Ge, Hf, Mg, La, Nb, Sc, Si, Sm, Sn, Sr, Ta, Ti, V, Yb or Zn.

In a further particular embodiment the solution contains Li and Ni as the metal of the metal compound. In addition to these the solution may further contain Co and Mn.

On account of the rotating flame the average residence time of the particles in the flame is lengthened. The rotational movement causes the flame itself to become narrower but also substantially longer compared to a flame burning in a reaction space without internals. The process according to the invention is preferably implemented such that gas supplied via a slot in an internal lengthens the average residence time of the reaction mixture in the reaction space by at least a factor of 1.2, particularly preferably 1.2-5, compared to a reaction space comprising none of these internals.

It is likewise possible to influence the rotation of the flame via the gas entry velocity from a slot in an internal into the reaction space. The gas entry velocity is preferably at least 10 Nm/s, particularly preferably 10-50 Nm/s.

EXAMPLES

Figure 1:
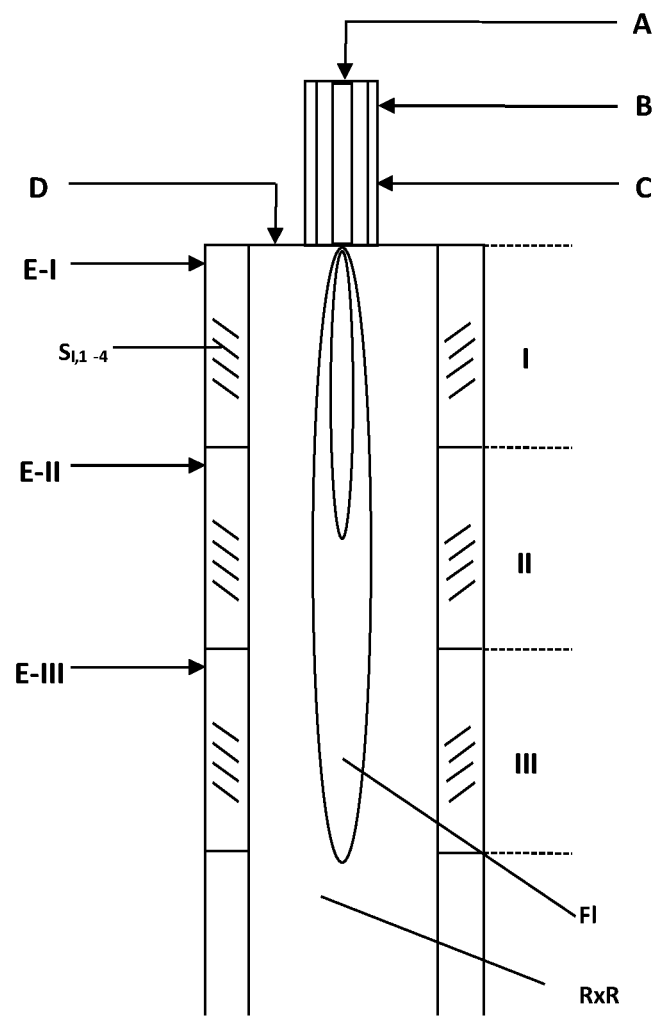

In the comparative examples the cylindrical reaction space comprises no internals. FIG. 1A shows in schematic form the input materials and the feed point thereof for the comparative examples.

Figures 2A, 2B, 2C:
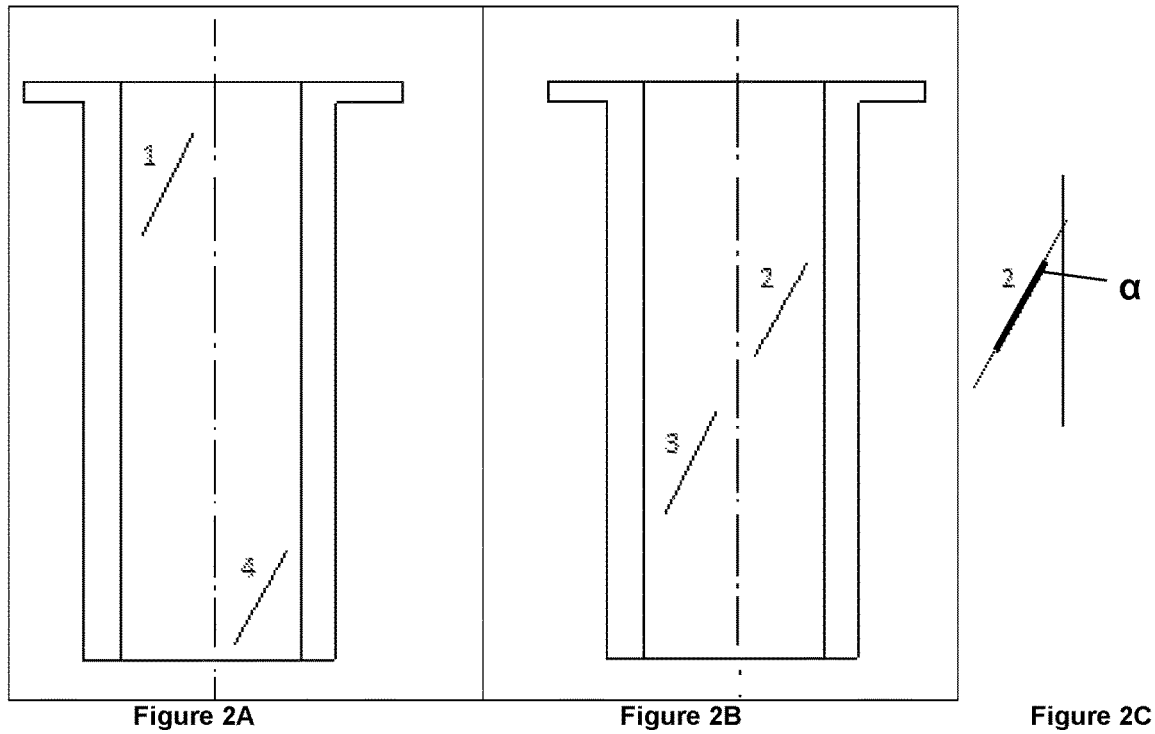
FIG. 2C shows a detailed view having regard to angle $\alpha$.

In the inventive examples the reaction space 3 comprises successive tubular internals, internal I-III, of 50 cm in length respectively. These are affixed in the reaction space. The internals comprise four slots having a length of 10 cm and a width of 0.15 cm. The arrangement of the slots is as shown in FIG. 2 and FIG. 3, where $\alpha=33°$ and $\beta=45°$. The slot length/slot width ratio is 67:1.

FIG. 1B shows in schematic form the input materials and the feed point thereof for the inventive examples.

The ratio of the diameter of the reaction space to the total slot area is 31.4:1.

Example 1.1 (Comparative)

Solution Employed:
Calcium octoate solution, Octa-Soligen Calcium 10, a mixture of calcium salts of C6-C19-fatty acids and naphtha (petroleum), OMG Borchers, containing 10 wt % of calcium.

2.5 kg/h of the solution are atomized into the tubular reaction space with 3.5 $Nm^3/h$ of atomization air by means of a two-material nozzle.

The reaction space comprises no internals.
The flame is formed by the reaction of 5 $Nm^3/h$ of hydrogen, 13 $Nm^3/h$ of primary air and 15 $Nm^3/h$ of secondary air. Further reaction parameters are reported in the table.

The obtained powder has a BET surface area according to DIN ISO 9277 of 20 $m^2/g$.

Example 1.2 (According to the Invention)

As per example 1 but via internal 115 $Nm^3/h$ of air are introduced into the reaction space.

The obtained powder has a BET surface area of 38 $m^2/g$.

Example 2.1 (Comparative)

Zinc octoate solution, Octa-Soligen Zink 29, a mixture of zinc salts of C6-C19-fatty acids and naphtha (petroleum), TIB, containing 29 wt % of zinc.

1.5 kg/h of the solution are atomized into the tubular reaction space with atomization air (4 $Nm^3/h$) by means of a two-material nozzle. The reaction space comprises no internals.

The flame is formed by the reaction of 5 $Nm^3/h$ of hydrogen and 24 $Nm^3/h$ of primary air. Further reaction parameters are reported in the table The obtained powder has a BET surface area according to DIN ISO 9277 of 11 $m^2/g$.

Example 2.2 (According to the Invention)

As per example 1 but via
internal I 20 $Nm^3/h$ of air and 1 $Nm^3/h$ of water vapour
internal II 10 $Nm^3/h$ of air and 1 $Nm^3/h$ of water vapour and
internal III 10 $Nm^3/h$ of air
are introduced into the reaction space.
The obtained powder has a BET surface area of 70 $m^2/g$.

Example 3.1 (Comparative)

Solution used: 5.21 wt % of lithium nitrate, 15.66% wt % of lanthanum nitrate, 10.35 wt % of zirconium nitrate, wt % of aluminium nitrate, remainder water. The concentration based on the oxide $Li_{6.27}La_3Zr_2Al_{0.24}O_{12}$ is 10.26 wt %.

8 kg/h of the solution are atomized into the tubular reaction space with an atomization gas consisting of 15 $Nm^3/h$ of air and 0.05 kg of ammonia gas/$Nm^3$ of air by means of a two-material nozzle.

The reaction space comprises no internals.

The flame is formed by the reaction of 13 $Nm^3/h$ of hydrogen, 75 $Nm^3/h$ of primary air and 25 $Nm^3/h$ of secondary air. Further reaction parameters are reported in the table.

The mixed oxide powder has a composition of $Li_{6.27}La_3Zr_2Al_{0.24}O_{12}$. The BET surface area is 5 $m^2/g$.

Example 3.2 (According to the Invention)

As per example 5 but via internal I and internal II 3 $Nm^3/h$ respectively of hydrogen are introduced into the reaction space.

The mixed oxide powder has a composition of $Li_{6.27}La_3Zr_2Al_{0.24}O_{12}$. The BET surface area is <1 $m^2/g$.

Example 3.3 (According to the Invention)

As per example 5 but via internal II 20 $Nm^3/h$ of air and via internal III 30 $Nm^3/h$ of air are introduced into the reaction space.

The mixed oxide powder has a composition of $Li_{6.27}La_3Zr_2Al_{0.24}O_{12}$. The BET surface area is 20 $m^2/g$.

Example 4.1 (Comparative)

Employed solution consisting of 13.3 wt % of lithium nitrate, 3.8 wt % of nickel(II) nitrate, 15.6 wt % of manganese(II) nitrate, 3.7 wt % of cobalt(II) nitrate and 0.05 wt % of boric acid, remainder water. Sum of metal is 8.6wt %.

10 kg/h of the solution are atomized into the tubular reaction space with an atomization gas consisting of 15 $Nm^3/h$ of air and 1.5 kg of ammonia gas/$Nm^3$ of air by means of a two-material nozzle.

The reaction space comprises no internals.

The flame is formed by the reaction of 13.9 $Nm^3/h$ of hydrogen and 45 $Nm^3/h$ of primary air. Further reaction parameters are reported in the table.

The mixed oxide powder has the composition $Li_{1.2}(Ni_{0.13}Co_{0.125}Mn_{0.54}B_{0.05})O_2$. The BET surface area is 14 $m^2/g$, the crystallite diameter $d_{XRD}=750$ nm.

Example 4.2 (According to the Invention)

As per example 7 but via internal I 40 $Nm^3/h$ of air and via internal II 10 $Nm^3/h$ of air are introduced into the reaction space.

The mixed oxide powder has the composition $Li_{1.2}(Ni_{0.13}Co_{0.125}Mn_{0.54}B_{0.05})O_2$. The BET surface area is 5 $m^2/g$, the crystallite diameter $d_{XRD}=5500$ nm.

Examples 1 and 2 show how the BET surface areas of a metal oxide powder may be increased by means of the process according to the invention compared to a process comprising no internals in the reaction space.

Examples 3 show that by means of the process according to the invention the BET surface area of the metal oxide powder may be both reduced (example 3.2) and increased (example 3.3) in each case compared to a process comprising no internals in the reaction space. The method oxide powder from example 3.2 also exhibits a high crystallinity.

Examples 4 show how the crystallinity of a metal oxide powder may be increased by means of the process according to the invention compared to a process comprising no internals in the reaction space.

Key to Table:
v=Gas entry velocity in internals I-III;
$v_{in}$=Gas velocity of the gases or vapours introduced into internals I-III;
t=average residence time in internal I-III;
$t^{ttl}$=average residence time via internals I-III;
$v^{ttl}$=average gas velocity via internals I-III;
a) atomization gas contains $NH_3$;
b) $N_2$ instead of air in example 3.3;
c) Nm/s=normalized velocity calculated from normal volume and cross section;
d) $T_{flame}$=flame temperature; measured 10 cm below feed point for aerosol, $H_2$ and air into the reaction space;
e) $T_{flame}^{(I)-(III)}$=flame temperature; measured 10 cm below internal;

TABLE

| Input materials and reaction conditions | | | | | | | | | | |
|---|---|---|---|---|---|---|---|---|---|---|
| Example | | 1.1 | 1.2 | 2.1 | 2.2 | 3.1 | 3.2 | 3.3 | 4.1 | 4.2 |
| $\dot{m}_{solution}$ | kg/h | 2.5 | 2.5 | 1.5 | 1.5 | 8 | 8 | 8 | 10 | 10 |
| $c_{metal}$ | wt % | 7 | 7 | 16 | 16 | 10.17 | 10.17 | 10.17 | 8.6 | 8.6 |
| $\dot{V}_{atomization\ air}$ | $Nm^3/h$ | 3.5 | 3.5 | 4 | 4 | $15^{a)}$ | $15^{a)}$ | $15^{a)\ b)}$ | $15^{a)}$ | $15^{a)}$ |
| $\dot{V}_{primary\ air}$ | $Nm^3/h$ | 13 | 13 | 24 | 24 | 75 | 75 | 75 | 45 | 5 |
| $\dot{V}_{secondary\ air}$ | $Nm^3/h$ | 15 | 15 | — | — | 25 | 25 | 25 | — | — |
| $\dot{V}_{hydrogen}$ | $Nm^3/h$ | 5 | 5 | 1.8 | 1.8 | 13 | 13 | 13 | 13.9 | 13.9 |
| $T_{flame}^{d)}$ | °C. | 788 | 788 | 1244 | 1244 | 517 | 517 | 515 | 789 | 979 |
| Internal I | | | | | | | | | | |
| $\dot{V}_{hydrogen}^{(I)}$ | $Nm^3/h$ | — | — | — | — | — | 3 | — | — | — |
| $\dot{V}_{air}^{(I)}$ | $Nm^3/h$ | — | 15 | — | 20 | — | — | — | — | 40 |
| $\dot{V}_{water\ vapour}^{(I)}$ | kg/h | — | — | — | 1 | — | — | — | — | — |
| $v_{in}^{(I)}$ | Nm/s | — | 17.6 | — | 19.4 | — | 10.2 | — | — | 15.4 |
| $v^{(I)}$ | Nm/s | 1.40 | 1.84 | 1.65 | 2.55 | 3.34 | 4.56 | 3.34 | 2.83 | 3.24 |
| $t^{(I)}$ | ms | 357 | 1.360 | 303 | 980 | 150 | 550 | 150 | 177 | 772 |
| $T_{flame}^{(I)\ e)}$ | °C. | 751 | 686 | 1023 | 643 | 498 | 681 | 498 | 723 | 983 |
| Internal II | | | | | | | | | | |

TABLE-continued

Input materials and reaction conditions

| Example | | 1.1 | 1.2 | 2.1 | 2.2 | 3.1 | 3.2 | 3.3 | 4.1 | 4.2 |
|---|---|---|---|---|---|---|---|---|---|---|
| $\dot{V}_{air}^{(II)}$ | Nm³/h | — | — | — | 10 | — | — | 30 | — | 10 |
| $\dot{V}_{water\ vapour}^{(II)}$ | kg/h | — | — | — | 1 | — | — | — | — | — |
| $v_{in}^{(II)}$ | Nm/s[c)] | — | — | — | 14.1 | — | — | 27.8 | — | — |
| $v^{(II)}$ | Nm/s | 1.15 | 1.75 | 1.47 | 2.89 | 2.49 | 4.83 | 3.86 | 2.17 | 2.61 |
| $t^{(II)}$ | ms | 435 | 286 | 340 | 865 | 2.01 | 104 | 650 | 230 | 958 |
| $T_{flame}^{(II)\ e)}$ | ° C. | 723 | 657 | 917 | 491 | 463 | 719 | 372 | 697 | 927 |
| | | | | | Internal III | | | | | |
| $\dot{V}_{hydrogen}^{(III)}$ | Nm³/h | — | — | — | — | — | 3 | — | — | — |
| $\dot{V}_{air}^{(III)}$ | Nm³/h | — | — | — | 10 | — | — | 20 | — | — |
| $v_{in}^{(III)}$ | Nm/s | — | — | — | 12.4 | — | 10.2 | 18.5 | — | — |
| $v^{(III)}$ | Nm/s | 0.94 | 1.63 | 1.33 | 3.34 | 2.03 | 5.62 | 4.02 | 2.03 | 2.26 |
| $t^{(III)}$ | ms | 532 | 307 | 376 | 750 | 2.46 | 445 | 620 | 246 | 221 |
| $T_{flame}^{(III)\ e)}$ | ° C. | 710 | 611 | 821 | 383 | 426 | 839 | 302 | 681 | 871 |
| | | | | | Sum internals I-III | | | | | |
| $v^{(ttl)}$ | Nm/s | 1.13 | 1.73 | 1.47 | 2.89 | 2.51 | 4.95 | 3.71 | 2.34 | 2.70 |
| $t^{(ttl)}$ | ms | 1324 | 1953 | 1019 | 2595 | 597 | 699 | 1420 | 653 | 1951 |

The invention claimed is:

1. A process for producing a metal oxide powder by flame spray pyrolysis, comprising the steps of:
   a) using an atomizer gas to atomize a stream of a solution and thereby produce an aerosol, wherein the solution comprises at least one oxidizable or hydrolysable metal compound;
   b) reacting the aerosol of step a) in a reaction space of a reactor with a flame obtained by ignition of a mixture of fuel gas and air to produce a reaction stream;
   c) cooling the reaction stream;
   d) removing a solid product from the cooled reaction stream of step c);
   wherein:
   i) the reaction space comprises one or more successive double-walled internals, wherein the wall of the double-walled internal facing a flame-conducting region of the reaction space comprises at least one slot through which a gas or vapour is introduced into the reaction space in which the flame is burning; and
   ii) the slot is arranged such that this gas or vapour brings about a rotation of the flame.

2. The process of claim 1, wherein the internal comprises at least two slots.

3. The process of claim 1, wherein slot length/slot width is 10:1-200:1.

4. The process of claim 1, wherein reaction space diameter/total slot area is 15:1-200:1.

5. The process of claim 1, wherein, when viewed in longitudinal section of an internal, an angle α of a slot to vertical is 15°≤α≤60°.

6. The process of claim 1, wherein angle β, which describes an angle between a section axis of the slot to a circle perpendicular of centre, is 30°≤β≤60°.

7. The process of claim 1, wherein the gas is a fuel gas.

8. The process of claim 1, wherein the gas is an oxygen-containing gas.

9. The process of claim 1, wherein a metal component of the metal compound is selected from the group consisting of Ag, Al, Au, B, Ba, Ca, Cd, Ce, Co, Cr, Cu, Dy, Fe, Ga, Ge, Hf, In, La, Li, Mg, Mn, Mo, Nb, Ni, Pd, Rh, Ru, Sc, Si, Sm, Sn, Sr, Ta, Ti, V, Y, Yb and Zn.

10. The process of claim 1, wherein the solution contains zinc, titanium or calcium as the metal of the metal compound.

11. The process of claim 1, wherein the solution contains Li, La and Zr as the metal of the metal compound.

12. The process of claim 1, wherein the solution contains Li and Ni as the metal of the metal compound.

13. The process of claim 1, wherein a gas supplied via a slot in an internal lengthens average residence time of the mixture of fuel gas and air in the reaction space by at least a factor of 1.2 compared to a reaction space comprising none of these internals.

14. The process of claim 1, wherein gas entry velocity from a slot of an internal into the reaction space is at least 10 Nm/s.

15. The process of claim 1, wherein the internal comprises four slots.

16. The process of claim 1, wherein angle β is 40°≤β≤50°.

17. The process of claim 2, wherein slot length/slot width is 10:1-200:1.

18. The process of claim 2, wherein reaction space diameter/total slot area is 15:1-200:1.

19. The process of claim 2, wherein the solution contains zinc, titanium or calcium as the metal of the metal compound.

20. The process of claim 2, wherein the solution contains Li, La and Zr as the metal of the metal compound.

* * * * *